Nov. 14, 1967   E. WOHLHAUPTER ET AL   3,352,185
BORING AND FACING HEAD
Filed Oct. 13, 1965   3 Sheets-Sheet 1

Inventors
Emil Wohlhaupter
Erwin Wohlhaupter
Fritz Eyring
By Walter Becker

United States Patent Office 3,352,185
Patented Nov. 14, 1967

3,352,185
BORING AND FACING HEAD
Emil Wohlhaupter, Erwin Wohlhaupter, and Fritz Eyring, Frickenhausen, Germany, assignors to Emil Wohlhaupter u. Co., Frickenhausen, Wurttemberg, Germany
Filed Oct. 13, 1965, Ser. No. 495,606
Claims priority, application Germany, Oct. 16, 1964, W 37,774
15 Claims. (Cl. 82—2)

The present invention relates to a boring and facing head, which is provided with a plurality of planetary blocks of planetary differential transmissions for the displacement of a transverse carriage. These planetary blocks are arranged on a control ring adapted to be held stationary. Each of said control blocks may, during operation, be brought into operative engagement with the respective central driving rings pertaining thereto.

Boring and facing heads of the above-mentioned type are known in which, for purposes of making the feed effective, a compact planetary gear block may be engaged during the operation of the machine, and, more specifically, may be brought into driving engagement with corresponding gear rings. According to one design of such heretofore known boring and facing heads, the planetary gears at the end of the feed and in response to the engagement of a slip clutch, rotate under overload until the machine is stopped or the planetary gears are, due to said overload, laterally disengaged from the gear ring. The rotation under overload and the lateral disengagement under overload, however, bring about an early destruction of the teeth.

Also with another design of heretofore boring and facing heads, the engagement and disengagement of the planetary gear blocks with and from the rotating gear rings is possible only at the expense of the life of the teeth.

The present invention is based on the finding that the above-mentioned drawbacks due to the engagement of the planetary gear blocks with running gear rings, can be remedied only by a continuous mesh of the pairs of gears with each other.

According to another heretofore known boring and facing head, the individual planetary gears corresponding to various carriage feeds are in continuous engagement with the corresponding gear rings. They are, however, engaged each time by electromagnetic clutches which require considerable space. Consequently, it is not possible to employ this design for building small or medium planetary turning heads or such heads which have a plurality of velocities.

It is, therefore, an object of the present invention to provide a boring and facing head which will overcome the above-mentioned drawbacks.

It is another object of this invention to provide a boring and facing head which will employ purely mechanical means while requiring a relatively small space.

It is also an object of this invention to provide a boring and facing head which will afford the possibility of a continuous mesh between the planetary gears and the central driving rings.

These and other objects and advantages of the invention will appear more clearly from the following specification in connection with the accompanying drawings, in which.

Figure 1:
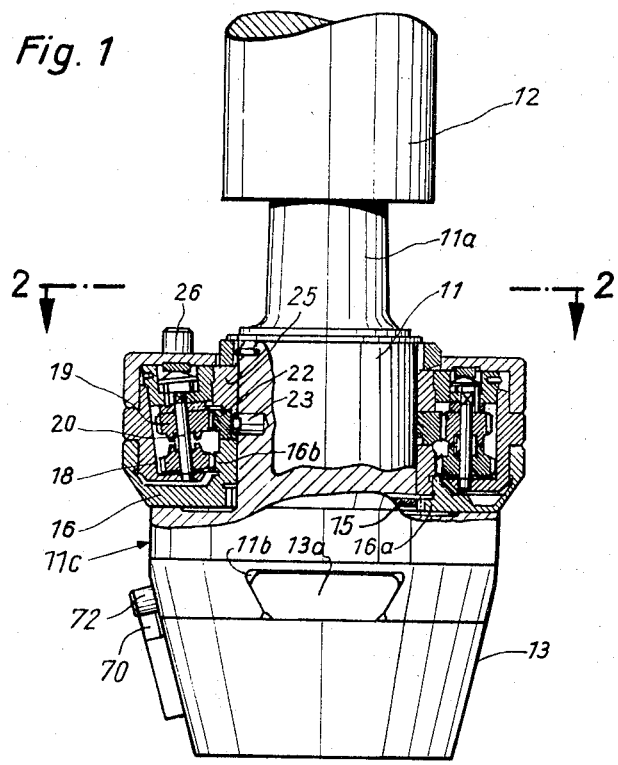
FIGURE 1 is a side view partly in section of a facing and boring head inserted into a machine tool spindle, FIGURE 1 being a section along the line 1—1 of FIGURE 2.

The boring and facing head according to the present invention is characterized primarily in that the planetary gear blocks comprise two separate but closely adjacent planetary gears which, at the time of selection of the respective block, are adapted to be combined to a firm block, said planetary gears being in continuous operative engagement with the respective central driving rings. The planetary gears can always remain in engagement with the central driving rings so that no gear-wearing engaging movement will be necessary with the gears and gear rings which rotate with greatly different speeds. Inasmuch as the non-united planetary gears of a block move relative to each other at speeds which differ only slightly from each other, it will be appreciated that when these gears are united or combined, only minor coupling forces and consequently only very slight wear will be encountered.

It is advantageous so to design the arrangement that a planetary gear of a planetary gear block will be under the influence of a force which urges this planetary gear out of the combination with the palnetary gear wheel and that said planetary gear is adapted when overcoming said force to be returned by an actuating member provided on a control ring into the combination position and to be held therein. This will assure that the planetary gears are always disengaged and that the clutch members will not slide on each other. Furthermore, provision is made to assure that the selected clutch cannot disengage itself. When the planetary gear is adapted to be axially displaced and to be disconnected from the block combination, it is advantageous to design those end faces of the planetary gears of a planetary gear block which face each other as jaw clutches the jaws of which are provided with inclined flanks adapted to engage each other. Such jaw clutch having, for instance, roof-shaped jaws, is adapted, in view of the slight difference in the velocities of the clutch parts, to be engaged during the rotation thereof and is adapted subsequently well to absorb the occurring forces without any material wear. In view of the inclined flanks, it is, however, possible that the jaw clutch automatically disengages itself when the forces to be transmitted exceed a certain value. In this way, a premature wear or even destruction of the transmission will be prevented.

Advanageously, the teeth of the planetary gears and of the gear rings pertaining thereto are designed as inclined or helical gears having an inclination which exerts a displacing force upon the planetary gears in a direction to separate the same, said displacing force being sufficient to maintain the already disengaged planetary gears out of engagement with each other. In this way, without the necessity of additional means such as springs or the like, a force separating the planetary gears will be produced while at the same time, better gear running properties are obtained.

It is also advantageous to have the planetary gears of at least some of the planetary gear blocks rotate on a shaft which is included with regard to the axis of rotation of the head. Advantageously, the degree of inclination on each individual planetary gear block is so selected that in spite of different pitch diameters of the individual planetary gears of a planetary gear block and/or the inner gear rings pertaining thereto, the two planetary gears will be in continuous mesh with the respective central driving gear pertaining thereto.

Referring now to the drawings in detail, the main body 11 of the turning or boring head comprises a shank 11a which is inserted into a bore (not shown) of a machine tool spindle 12. That end face of main body 11 which faces away from shank 11a is provided with dove-tailed guiding means for guiding a transverse carriage 13 having a dove-tailed extension 13a. The lower portion of main body 11 has a greater diameter than the upper portion thereof and is provided with flat sections 11c, as is clearly shown in FIG. 2.

Figure 5:
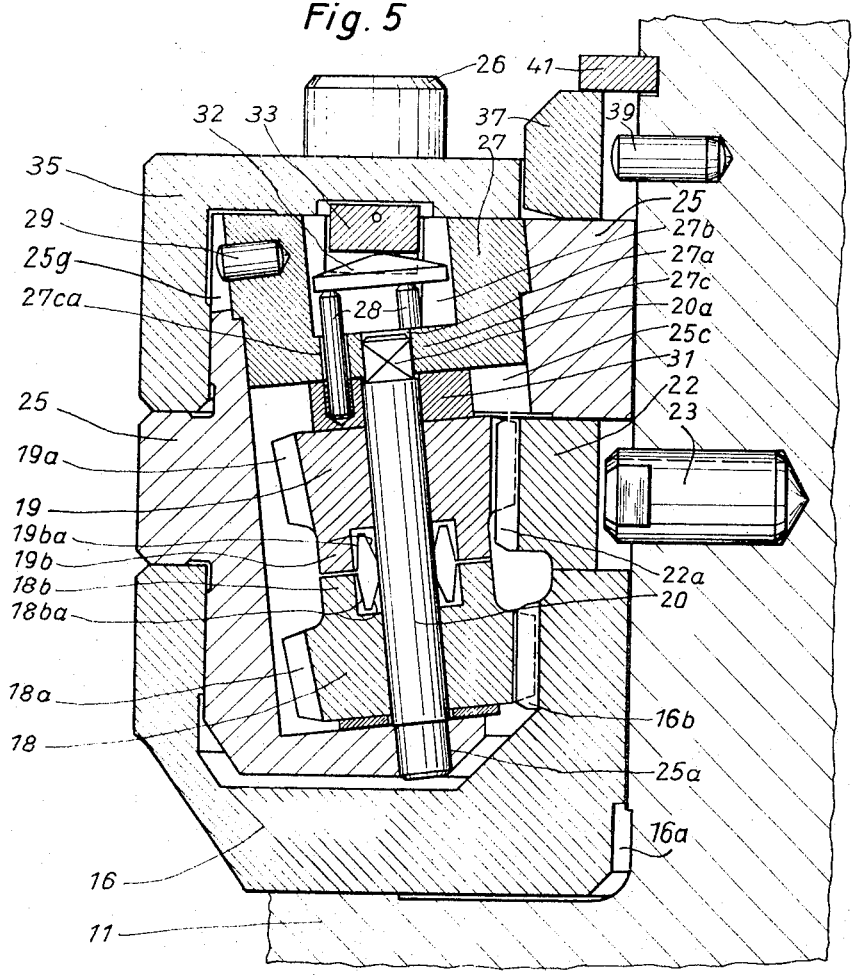
FIGURE 5 illustrates on a somewhat larger scale than FIGURES 1 to 4 the left-hand central area of FIGURE 1.

The arrangement furthermore comprises a pinion 15 which pertains to the drive for the transverse carriage and meshes with an inner gear ring 16a of a scale ring 16[1]. Ring 16 is adapted to rotate centrally with regard to main body 11 and has an outer gear ring 16b meshing with a planetary gear 18 which is rotatable about a shaft 20. Rotatably mounted on shaft 20 is also a second planetary gear 19 which meshes with a gear ring 22 which latter is non-rotatably connected to main body 11 and secured thereto by means of a pin 23 (FIGS. 1 and 5). Those end faces of planetary gears 18 and 19 which face each other are provided with jaw clutch sections 18b and 19b, respectively. Planetary gears 18 and 19 may form a planetary gear block. The particular embodiment shown in the drawing comprises three of such planetary gear blocks which have different transmission ratios.

Gear ring 22 has teeth 22a which are longer than the teeth 19a of the second planetary gear wheel 19, so that the teeth will not even partially disengage each other when the planetary gear 19 is displaced axially to a certain extent. Teeth 19a of gear 19, teeth 22a of gear ring 22 and teeth 18a of planetary gear 18 as well as the teeth 16b of ring 16 are inclined and, more specifically, the longitudinal idrection of these teeth is inclined with regard to the axis of rotation of the respective wheel. The inclination of these two gears is of different direction so that the axial thrust occurring with such inclined tooth arrangement will urge the planetary gear 18 into downward direction and the planetary gear 19 in upward direction whereby the clutch portions 18b and 19b cannot engage each other without special counterforces. One end of shaft 20 is held in a bore 25a of a holding or control ring 25 adapted to be held stationary, ring 25 being rotatable centrally on main body 11. The other end of shaft 20 forms a square head 20a and is held in a correspondingly shaped recess 27a of a bearing insert 27 which latter secures shaft 20 against rotation. Bearing insert 27 is located in a recess 25c of the upper end face of holding ring 25 and is secured against rotation by a pin 29 engaging a slot 25g in ring 25. Bearing insert 27 has a recess 27b the bottom 27c of which is provided with three bores 27ca which are evenly spaced from the geometric axis of square-shaped recess 27a. Bores 27ca guide three pins 28 having one end fixedly connected to a pressure ring 31 arranged between bearing insert 27 and planetary gear 19. Pressure ring 31 is axially displaceable on shaft 20. The free ends of pins 28 are engaged by the bottom of a disc 32 the top of which is conical. The diameter of disc 32 is somewhat less than the diameter of recess 27b.

Figure 2:
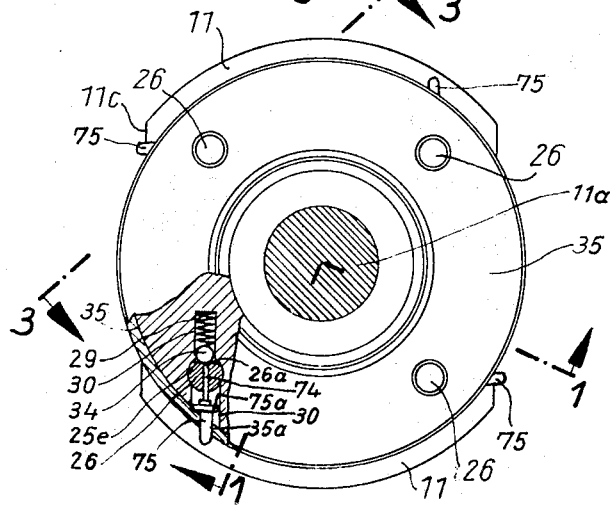
FIGURE 2 is a section along the line 2—2 of FIGURE 1 and also represents a partial section along the line 2a—2a of FIGURE 3.

A flat tiltable lever 33 rests on disc 32. Lever 33 is tiltably arranged in a manner shown in FIG. 3 (however, not in connection with the control of the planetary gears). More specifically, one end of lever 33 is tiltable in a seat 50 in holding ring 25. The particular arrangement shown in the drawing has a total of four tiltable levers 33 with actuating means pertaining thereto in holding ring 25. The actuating means for each tiltable lever 33 consists of a cylindrical pushbutton 26 which is guided parallelly with regard to the axis of rotation of the boring head in a bore 25e of holding ring 25. Each pushbutton 26 has its circumference provided with two snap-locking seats 26a and 26b (of which FIG. 2 shows only snap-locking seat 26a), adapted to be engaged by a ball 34 which is under the load of a spring 29 and which is axially displaceable in a bore 30 crossing the bore 25e. Ball 34 will engage seats 26a, 26b when pushbutton 26 has moved into its pressed-in position. A pin 74 (FIG. 2) is adapted against the thrust of spring 29 to be pressed into seat 26a. As will be seen from the drawing, pin 74 which is longitudinally displaceable, extends through a bore in button 26. Pin 74 is adapted to be actuated through the intervention of a button 75 which is guided by means of an enlarged portion 75a in a bore 30 and is furthermore guided in a bore 35a of a ring 35. The buttons 75 protrude beyond the circumference of ring 35 so that they can be pressed in when the drilling head rotates, whereby a pressed-in button 26 can be released. Ring 35, which has the shape of a cap, extends over holding ring 25 and the three inserts 27 and the four tilting levers 33. Cap-shaped ring 35 is provided with bores 35e through which the pushbuttons 26 extend upwardly. Ring 35 is connected to the holding ring 25 through a further pin 43a, which will be referred to further below. Holding ring 25 is secured in axial direction to shank 11a by means of a ring 37. Ring 37 is non-rotatably secured to main body 11 by means of a pin 39 and in its turn rests axially against a safety ring 41.

Figure 3:
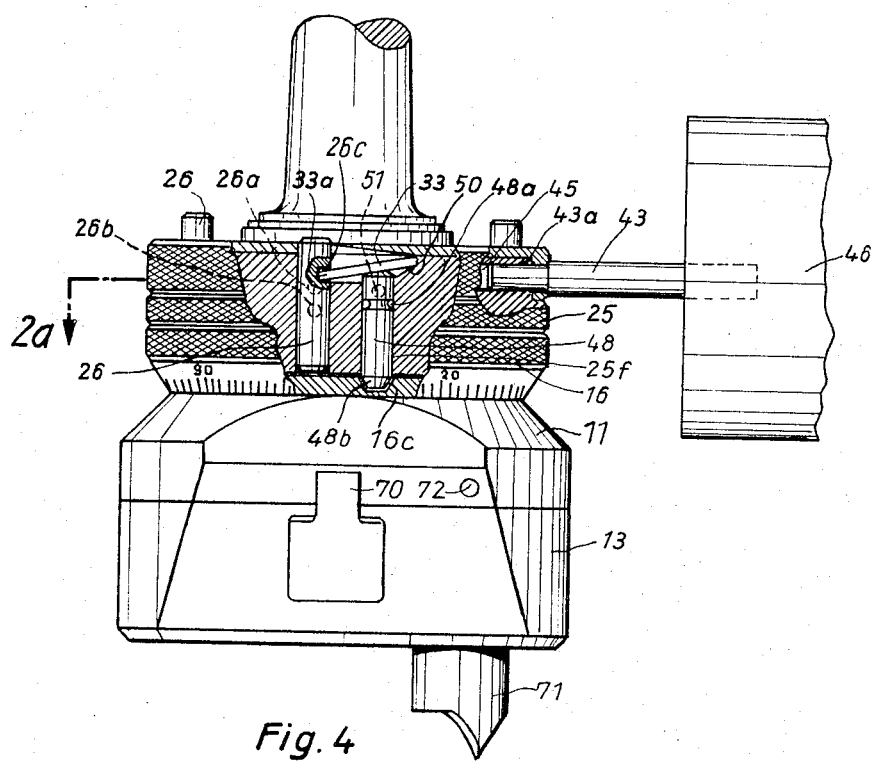
FIGURE 3 is a section along the line 3—3 of FIGURE 2, the head illustrated in FIGURE 3 carrying a tool and being provided with an abutment bar for abutment with a stationary machine part.

Holding ring 25 may be stopped with regard to the rotating main body 11 by hand or by a stopping bar 43 (FIG. 3). Bar 43 has an offset end 43a by means of which it can be inserted through a bore 35a in cap-shaped ring 35 and into a blind bore 45 in ring 25 while its free end is adapted to abut a stationary part 46 of the machine tool. For purposes of selectively connecting scale ring 16 to holding ring 25, there is provided a holding bolt 48 associated with one of the four push buttons 26 and provided with an annular groove 48a and with a conical end 48b. Holding bolt 48 is guided in a corresponding bore 25f of holding ring 25. Holding bolt 48 is adapted by means of its conical end 48b to enter a conical blind bore 16c of scale ring 16. The displacing force required to this end is furnished by one of the four levers 33 which have one end tiltably mounted in a socket 50 on holding ring 25. The respective lever 33 has that end 33a thereof which is remote from said tilting point extending into a recess 26c of one of the four push buttons 26. Of the protruding push buttons 26, that one is specially marked which actuates holding bolt 48 (fast return button).

Figure 4:
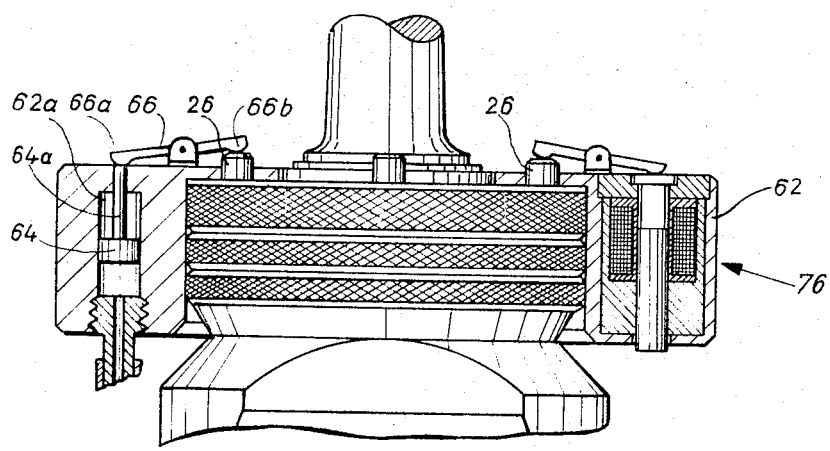
FIGURE 4 illustrates partially in side view and partially in section the head according to the invention with mounted radially sectioned auxiliary ring and actuating mechanism.

According to FIG. 4, an additional ring 62 is placed upon the head and is provided with a pneumatic or hydraulic 64 or electromagnetic 76 actuating mechanism for the four push buttons 26. With the hydraulic actuating mechanism 64, a piston 64b each with piston rod 64a is displaceably mounted in the four bores 62a. The free end of piston rod 64a protrudes from the upper surface of ring 62 and is operatively connected to one end 66a of a two-arm lever 66 which is pivotally sup-

---

[1] The drive for the transverse carriage 13 is known per se, see e.g. German Patent No. 845,737.

ported by ring 62 and the other end 66b of which is adapted to press upon the respective adjacent push button 26. However, if desired, the push buttons 26 may also be actuated purely mechanically or in any other convenient manner, and the additional ring 62 may be of any desired shape or may be omitted altogether. Furthermore, buttons 75 may be actuated in a manner similar to the actuation of the push buttons 26 which means hydraulically, mechanically or electromagnetically (FIG. 2).

The boring and facing head according to the invention is intended for three different possible feed velocities and a return movement. The difference between these three feeding velocities is effected by the respective difference in teeth between the two planetary gears of a planetary gear block. FIG. 1 shows two of these planetary gear blocks. The planetary gear block shown on the right-hand side of FIG. 1 is movable on a shaft which is parallel to the geometric axis of the head. The planetary gear block 18, 19 on the left-hand side of FIG. 1 has a greater difference in the number of teeth between the upper and lower planetary gear wheel than the block on the right-hand side of FIG. 1, and, therefore, the upper planetary wheel 19 has a greater diameter than the upper planetary wheel of the other block. The left-hand planetary gear block 18, 19 rotates about an axis which is inclined to the axis of rotation of the head. This inclined arrangement and a special and corresponding design of the teeth of the plaanetary gears brings about that all provided transmissions although of different numbers of teeth or different wheel diameters can be realized on the same gear rings 16b and 22a, which would otherwise not be possible without complicated arrangements as, for instance, intermediate gears. The teeth of both planetary gear wheels of an inclined planetary gear block have, in contrast to customary bevel gears, over their entire length the same cross-section which corresponds to the cross-section of the teeth of gear rings 16b and 22a located on a cylinder mantle surface. The teeth of the two planetary gear wheels, similar to the bevel gear teeth, have depending on the viewed portion of the tooth, a different pitch diameter whereby the pitch circles together form a pitch circle conical mantle.

*Operation*

It may be assumed that the boring and facing head according to the present invention has been introduced into machine spindle 12. It is furthermore assumed that the said head on its carriage 13 carries a tool 71 (FIG. 3), and that the holding bar 43 abuts the machine part 46. Furthermore, it may be assumed that all jaw clutches of the various planetary gear blocks are disengaged and that the holding bolt 48 disengages bore 16c. Finally, it may be assumed that the main body 11 rotates and thus also the tool 71 rotates without feed.

If now one of the three not particularly marked push buttons 26 is depressed, one end of lever 33 moves so that this end carries out a tilting movement, presses upon conical disc 32 and through the latter and through the intervention of pins 28 and pressure ring 31 forces planetary gear wheel 19 to move in the direction toward planetary gear wheel 18, so that the jaw clutch sections 18b and 19b engage each other. When push button 26 is depressed, ball 34 will respectively against and under the influence of spring 29 be moved out of engagement with the bore 26b and into the bore 26a and will thus prevent the jaw clutches 18b and 19b from being disengaged again during normal operation. The power by means of which the clutch sections 18b and 19b are kept in engagement with each other is considerably greater than the disengaging force which is produced in operation by the inclined teeth.

Scale ring 16 now moves relative to gear ring 22 at a velocity which is determined by the transmission gear ring 22—planetary gear wheel 19—planetary wheel 18— and gear ring 16b. Inasmuch as the planetary gears 18 and 19 when disengaged have a relatively minor speed difference, the coupling operation is effected without hard shocks on mechanically rather sensitive parts.

When carriage 13 has moved to such an extent that its abutment 70 abuts bolt 72, scale ring is stopped. The driving torque now acts entirely upon the jaw clutch. Since, however, the jaw clutch sections 18b and 19b have inclined tooth flanks 18ba and 19ba respectively, they will be able to press the planetary gear wheel 19 away from planetary wheel 18 while overcoming the locking force of ball 34 in socket 26a. When said locking force has been overcome and button 26 is again in its starting position, i.e. the jaw clutch sections 18b and 19b remain disengaged, fast return button 26 (FIG. 2) is depressed for initiating the fast return movement. Button 26 holds lever 33 and thereby holding bolt 48 so that its end 48b (FIG. 3) enters the recess 16c. In view of the thus effected direct engagement of holding ring 25 with scale ring 16, a carriage return at high speed will be obtained through the intervention of gear ring 16a and pinion 15.

After the carriage 13 has completed its return stroke, it is stopped in any desired manner[2] so that relative movements between holding ring 25 and scale ring 16 will occur. In this connection, the conical end 48b of holding bolt 48 is displaced from its socket 16c and bolt 48 moves into its starting position while the locking force at 26a is overcome, and after a certain stroke, push button 26 is again arrested at 26b. Holding bolt 48 is locked on its annular groove 48a at the locking position 51. It is now possible to depress any desired push button 26 for feeding.

It is also possible prior to abutment 70 hitting bolt 72 to actuate fast return push button 26 or during the feeding stroke directly to press upon another push button 26 in order to change the feeding speed. The previously depressed push button will then automatically jump out of its respective position. Furthermore, it is also possible by depressing one of the four push buttons 75 to interrupt any one of the three feeds as well as the fast return movement without initiating a new movement.

It is, of course, to be understood that the present invention is, by no means, limited to the particular constructions shown in the drawings but also comprises any modifications within the scope of the appended claims. Thus, instead of the gear transmissions, also individually or generally friction wheel transmissions may be employed. Furthermore, the respective upper planetary gear or the holding bolt 48 may be depressed directly with the tilting lever mechanism provided that sufficient actuating and locking forces are available.

What we claim is:

1. A boring and facing head having a shank for driving connection with a machine tool spindle, which includes: a tool carriage adapted to receive and support a tool and movable in a direction transverse to the axis of rotation of said head, and planetary gear transmission means interposed between said shank and said carriage and operable to actuate the latter, said planetary gear transmission means including first central gear means drivingly connected to said shank for rotation therewith and also including second central gear means rotatable relative to said shank, said planetary gear transmission means furthermore including a plurality of planetary gear sets, each of said gear sets having a first planetary gear in continuous mesh with said first central gear means and also having a second gear in continuous mesh with said second central gear means while selectively being movable into and out of driving engagement with the first planetary gear pertaining to one and the same gear set.

2. A boring and facing head according to claim 1, in which said planetary gear sets respectively have different transmission ratios.

---

[2] Known per se, e.g. by a stop member corresponding to bolt 72.

3. A boring and facing head having a shank for driving connection with a machine tool spindle, which includes: a tool carriage adapted to receive and support a tool and movable in a direction transverse to the axis of rotation of said head, planetary gear transmission means interposed between said shank and said carriage and operable to actuate the latter, said planetary gear transmission means including first central gear means drivingly connected to said shank for rotation therewith and also including second central gear means rotatable relative to said shank, said planetary gear transmission means furthermore including a plurality of planetary gear sets, each of said gear sets having a first planetary gear in continuous mesh with said first central gear means and also having a second gear in continuous mesh with said second central gear means, means continuously urging the planetary gears of one and the same set in axial direction thereof away from each other so as to disengage the same, and means supported by said head and operable selectively to counteract said last mentioned means and to move the planetary gears of one and the same set into and hold the same in driving engagement with each other.

4. A boring and facing head according to claim 1, in which the first and second planetary gear of each planetary gear set respectively have two surfaces facing each other and provided with jaws for coupling engagement with each other, the respective interengageable jaws being provided with inclined surfaces for engagement with each other.

5. A boring and facing head having a shank for driving connection with a machine tool spindle, which includes: a tool carriage adapted to receive and support a tool and movable in a direction transverse to the axis of rotation of said head, planetary gear transmission means interposed between said shank and said carriage and operable to actuate the latter, said planetary gear transmission means including first central gear means drivingly connected to said shank for rotation therewith and also including second central gear means rotatable relative to said shank, said planetary gear transmission means furthermore including a plurality of planetary gear sets, each of said gear sets having a first planetary gear in continuous mesh with said first central gear means and also having a second gear in continuous mesh with said second central gear means, and a plurality of control means respectively associated with said planetary gear sets and operable selectively to move the first and second planetary gear of the respective set toward each other into driving engagement with each other and away from each other for interrupting said driving engagement, the gears of said planetary gear sets and said first and second central gear means respectively meshing with the first and second gears of said planetary gear sets being provided with inclined teeth having such an inclination as to hold the respective first and second gears of said planetary gear set in drivingly disengaged position after said first and second gears have been drivingly disconnected by said control means.

6. A boring and facing head according to claim 4, in which said first and second central gear means and the planetary gears meshing therewith are provided with inclined teeth of such an inclination as to continuously urge said first and second planetary gears of the respective planetary gear sets into spaced position out of driving engagement with each other, and which includes control means respectively associated with said planetary gear sets and operable selectively to move the first and second planetary gears of the respective planetary gear set into driving engagement with each other, and yieldable holding means operable to hold the first and second planetary gear of the respective set in driving engagement with each other, said holding means being operable in response to the force exerted by the intermeshing teeth of the respective central gear means and the planetary gears meshing therewith exceeding the holding force of said holding means to permit the spacing tendency of the intermeshing teeth of said first and second central gear means and the planetary gears of the respective planetary gear set to cause the planetary gears of the respective planetary gear set to drivingly disengage each other.

7. A boring and facing head according to claim 1, in which the first and second planetary gears of at least one of said planetary gear sets are rotatable about an axis inclined with regard to the axis of rotation of said shank.

8. A boring and facing head according to claim 7, in which the teeth of each planetary gear set the planetary gears of which are rotatable about an axis inclined to the axis of rotation of said shank are located on a pitch circle conical mantle of which that mantle line which is in engagement with the respective central gear means pertaining thereto is substantially equi-distantly located with regard to the axis of said boring and facing head.

9. A boring and facing head according to claim 8, in which the teeth pertaining to an inclined planetary gear and located on a conical mantle have over their entire length uniform tooth cross sections respectively corresponding to the tooth cross sections of the teeth pertaining to said first and second central gear means and located on a cylinder mantle surface.

10. A boring and facing head according to claim 1, which includes control ring means extending around the axis of rotation of said shank and adapted to be held stationary, shaft means supported by said control ring means and respectively rotatably supporting said planetary gear sets, and coupling means extending through said control ring means and operable selectively to couple said second control gear means to said control ring means.

11. A boring and facing head having a shank for driving connection with a machine tool spindle, which includes: a tool carriage adapted to receive and support a tool and movable in a direction transverse to the axis of rotation of said head, planetary gear transmission means interposed between said shank and said carriage and operable to actuate the latter, said planetary gear transmission means including first central gear means drivingly connected to said shank for rotation therewith and also including second central gear means rotatable relative to said shank, said planetary gear transmission means furthermore including a plurality of planetary gear sets, each of said gear sets having a first planetary gear in continuous mesh with said first central gear means and also having a second gear in continuous mesh with said second central gear means, a plurality of actuating means respectively associated with the first planetary gear of said planetary gear sets and operable selectively to move the respective first planetary gear into mesh with the second planetary gear pertaining to the same planeary gear set, means associated with the first and second planetary gears of the planetary gear sets for urging the gears of the respective set out of engagement with each other, said head also including control ring means extending around said shank and adapted to be held stationary, shaft means supported by said control ring means and respectively rotatably supporting said planetary gear sets, and means including push button means protruding from said control ring means and operable selectively to actuate said actuating means for moving a selected first planetary gear into driving engagement with the respective second planetary gear pertaining to the same planetary gear set, and locking means responsive to the actuation of said push button means for holding the latter in its respective adjusted position.

12. A head according to claim 11, which includes means operatively connected to said push button means and operable selectively to release the same from their adjusted position in which they bring about driving engagement between said first and second planetary gears of the planetary gear set associated therewith.

13. An arrangement according to claim 12, which includes additional ring means surrounding said control ring means and power operable means supported by said additional ring means and operatively connected to said locking means for actuating the same so as to release said push button means.

14. A boring and facing head according to claim 11, which includes annular means surrounding said control ring means, and power operable means operatively connected to said push button means for actuating the same.

15. A boring and facing head according to claim 14, in which said power operable means are adapted to be remote-controlled.

References Cited
UNITED STATES PATENTS 2,093,743  9/1937  Steiner _____ 82—2 X WILLIAM W. DYER, JR., *Primary Examiner.*

LEONIDAS VLACHOS, *Examiner.*